(12) United States Patent
Jayanti Venkata et al.

(10) Patent No.: US 9,729,542 B2
(45) Date of Patent: Aug. 8, 2017

(54) COMPARTMENTALIZING APPLICATION DISTRIBUTION FOR DISPARATE ELECTRONIC DEVICES

(71) Applicant: Oracle International Corporation, Redwood Shores, CA (US)

(72) Inventors: Bhagavati Kumar Jayanti Venkata, Bangalore (IN); Sidhartha Das, Bangalore (IN); Harsh Maheshwari, Indore (IN); Karan Aggarwal, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/689,722

(22) Filed: Apr. 17, 2015

(65) Prior Publication Data
US 2016/0085533 A1 Mar. 24, 2016

Related U.S. Application Data

(60) Provisional application No. 62/054,544, filed on Sep. 24, 2014.

(51) Int. Cl.
*G06F 9/445* (2006.01)
*H04L 29/06* (2006.01)
(Continued)

(52) U.S. Cl.
CPC ............ *H04L 63/0823* (2013.01); *G06F 8/60* (2013.01); *G06F 8/61* (2013.01); *G06F 8/71* (2013.01);
(Continued)

(58) Field of Classification Search
CPC ..... H04L 63/0823; H04L 41/082; G06F 8/60; G06F 8/61; G06F 8/71; G06F 21/45; G06F 21/30
See application file for complete search history.

(56) References Cited

U.S. PATENT DOCUMENTS

| 7,080,078 B1 | 7/2006 | Slaughter et al. |
| 7,620,001 B2 | 11/2009 | Ganji |

(Continued)

FOREIGN PATENT DOCUMENTS

| EP | 2 282 477 A1 | 2/2011 |
| EP | 2 676 497 A1 | 12/2013 |

(Continued)

OTHER PUBLICATIONS

NPL-StackOverflow-iphone plist-2009, located at http://stackoverflow.com/questions/1756636/what-is-the-use-of-plist 2009.*

(Continued)

*Primary Examiner* — Wei Zhen
*Assistant Examiner* — Hossain Morshed
(74) *Attorney, Agent, or Firm* — Kilpatrick Townsend and Stockton LLP

(57) ABSTRACT

Techniques are provided for generating a logical application by grouping multiple physical distributions of an application for programming a plurality of electronic devices. A logical application can run separate commands through a single interface, lessening the number of connections needed between different user's electronic devices (e.g., smart phones, tablets, workstations, wearable computers) and a company's various servers. In certain embodiments, different physical distributions of the application may correspond to different operating systems versions of the application. Compiled code for each of these operating systems and device types is controlled and assigned to select users' devices from vastly different distribution architectures. In certain embodiments, a particular version (i.e., physical distribution) of the logical application to be installed to the device is determined based on the operating system of the (Continued)

device and the appropriate version of the logical application is installed on the device.

16 Claims, 10 Drawing Sheets

(51) Int. Cl.

| | | |
|---|---|---|
| *G06F 9/44* | (2006.01) | |
| *G06F 21/45* | (2013.01) | |
| *G06F 21/30* | (2013.01) | |
| *H04L 12/24* | (2006.01) | |
| *G06F 21/31* | (2013.01) | |
| *H04L 29/08* | (2006.01) | |
| *H04L 9/32* | (2006.01) | |
| *H04W 4/00* | (2009.01) | |
| *H04W 12/08* | (2009.01) | |
| *H04W 28/08* | (2009.01) | |
| *H04L 12/803* | (2013.01) | |
| *H04W 12/06* | (2009.01) | |
| *H04W 16/06* | (2009.01) | |
| *H04W 4/08* | (2009.01) | |

(52) U.S. Cl.
CPC .............. *G06F 21/30* (2013.01); *G06F 21/31* (2013.01); *G06F 21/45* (2013.01); *H04L 9/3268* (2013.01); *H04L 41/20* (2013.01); *H04L 41/28* (2013.01); *H04L 47/125* (2013.01); *H04L 63/08* (2013.01); *H04L 63/083* (2013.01); *H04L 63/0876* (2013.01); *H04L 63/10* (2013.01); *H04L 63/101* (2013.01); *H04L 63/102* (2013.01); *H04L 63/104* (2013.01); *H04L 63/105* (2013.01); *H04L 63/20* (2013.01); *H04L 63/205* (2013.01); *H04L 67/02* (2013.01); *H04L 67/10* (2013.01); *H04L 67/26* (2013.01); *H04L 67/306* (2013.01); *H04W 4/001* (2013.01); *H04W 4/003* (2013.01); *H04W 12/06* (2013.01); *H04W 12/08* (2013.01); *H04W 16/06* (2013.01); *H04W 28/08* (2013.01); *G06F 9/4445* (2013.01); *H04L 41/082* (2013.01); *H04L 41/5096* (2013.01); *H04W 4/08* (2013.01)

(56) References Cited

U.S. PATENT DOCUMENTS

| | | | |
|---|---|---|---|
| 7,707,643 B2 | 4/2010 | DeMello et al. | |
| 7,711,796 B2 | 5/2010 | Gutt et al. | |
| 7,746,851 B2 | 6/2010 | Chandrasiri et al. | |
| 7,886,033 B2 | 2/2011 | Hopmann et al. | |
| 7,925,729 B2 | 4/2011 | Bush et al. | |
| 8,086,233 B2 | 12/2011 | Millet et al. | |
| 8,281,010 B2 | 10/2012 | Ansari et al. | |
| 8,359,016 B2 * | 1/2013 | Lindeman | H04W 4/001 |
| | | | 455/414.1 |
| 8,548,452 B2 | 10/2013 | Coskun et al. | |
| 8,572,676 B2 | 10/2013 | Sapp et al. | |
| 8,583,683 B2 | 11/2013 | Rathod | |
| 8,595,186 B1 * | 11/2013 | Mandyam | G06F 8/38 |
| | | | 707/632 |
| 8,688,147 B2 | 4/2014 | Nguyen et al. | |
| 8,769,270 B2 | 7/2014 | Orsini et al. | |
| 8,812,685 B2 | 8/2014 | Fuller | |
| 8,856,289 B2 | 10/2014 | Ansari et al. | |
| 8,935,275 B2 | 1/2015 | Rathod | |
| 9,106,661 B1 | 8/2015 | Stamos | |
| 9,210,183 B2 | 12/2015 | Sadovsky et al. | |
| 9,535,675 B2 | 1/2017 | Mohamad Abdul et al. | |
| 2004/0054676 A1 * | 3/2004 | McNally | G06F 17/30719 |
| 2005/0125509 A1 * | 6/2005 | Ramachandran | G06F 8/61 |
| | | | 709/220 |
| 2006/0048142 A1 | 3/2006 | Roese et al. | |
| 2007/0055752 A1 | 3/2007 | Wiegand et al. | |
| 2007/0093243 A1 | 4/2007 | Kapadekar et al. | |
| 2007/0243862 A1 | 10/2007 | Coskun et al. | |
| 2008/0168072 A1 | 7/2008 | Freedman | |
| 2009/0254392 A1 | 10/2009 | Zander | |
| 2009/0265701 A1 * | 10/2009 | Naslavsky | G06F 8/61 |
| | | | 717/172 |
| 2009/0300742 A1 | 12/2009 | Ahn | |
| 2010/0114618 A1 | 5/2010 | Wilcock et al. | |
| 2010/0185263 A1 | 7/2010 | Stevenson et al. | |
| 2011/0282836 A1 | 11/2011 | Erickson et al. | |
| 2012/0084184 A1 | 4/2012 | Raleigh et al. | |
| 2012/0106399 A1 | 5/2012 | Abendroth et al. | |
| 2012/0131327 A1 | 5/2012 | Tomlinson | |
| 2012/0179802 A1 | 7/2012 | Narasimhan et al. | |
| 2012/0278454 A1 | 11/2012 | Stewart et al. | |
| 2012/0297444 A1 | 11/2012 | Kacherov et al. | |
| 2013/0219307 A1 * | 8/2013 | Raber | G06F 3/0484 |
| | | | 715/763 |
| 2013/0247028 A1 * | 9/2013 | Brooks | G06F 8/68 |
| | | | 717/177 |
| 2013/0254834 A1 | 9/2013 | King | |
| 2013/0262626 A1 * | 10/2013 | Bozek | H04L 67/10 |
| | | | 709/217 |
| 2014/0006347 A1 | 1/2014 | Qureshi et al. | |
| 2014/0007084 A1 * | 1/2014 | Ding | G06F 8/61 |
| | | | 717/178 |
| 2014/0007182 A1 | 1/2014 | Qureshi et al. | |
| 2014/0007183 A1 | 1/2014 | Qureshi et al. | |
| 2014/0007214 A1 * | 1/2014 | Qureshi | G06F 21/10 |
| | | | 726/12 |
| 2014/0032759 A1 * | 1/2014 | Barton | H04L 67/10 |
| | | | 709/225 |
| 2014/0040975 A1 | 2/2014 | Raleigh et al. | |
| 2014/0068030 A1 | 3/2014 | Chambers et al. | |
| 2014/0108801 A1 | 4/2014 | McBride et al. | |
| 2014/0113593 A1 | 4/2014 | Zhou et al. | |
| 2014/0162614 A1 | 6/2014 | Lindeman et al. | |
| 2014/0172799 A1 | 6/2014 | Dorman | |
| 2014/0199962 A1 | 7/2014 | Mohammed et al. | |
| 2014/0207220 A1 | 7/2014 | Boling et al. | |
| 2014/0259178 A1 * | 9/2014 | Karaa | G06F 8/61 |
| | | | 726/27 |
| 2014/0280815 A1 | 9/2014 | Candelaria et al. | |
| 2014/0337528 A1 | 11/2014 | Barton et al. | |
| 2015/0009533 A1 | 1/2015 | Anno et al. | |
| 2015/0070585 A1 | 3/2015 | Sharif-ahmadi et al. | |
| 2015/0156122 A1 | 6/2015 | Singh et al. | |
| 2015/0249684 A1 | 9/2015 | Zhang et al. | |
| 2015/0278245 A1 | 10/2015 | Sagar et al. | |
| 2015/0281087 A1 | 10/2015 | Jalan et al. | |
| 2015/0302338 A1 | 10/2015 | Zaveri | |
| 2015/0304891 A1 | 10/2015 | Dinan | |
| 2016/0087854 A1 | 3/2016 | Venkata et al. | |
| 2016/0087955 A1 | 3/2016 | Abdul et al. | |
| 2016/0087956 A1 | 3/2016 | Maheshwari et al. | |
| 2016/0088021 A1 | 3/2016 | Venkata et al. | |
| 2016/0088026 A1 | 3/2016 | Abdul et al. | |
| 2016/0199658 A1 | 7/2016 | Nassif et al. | |
| 2017/0063846 A1 | 3/2017 | Mohamad Abdul et al. | |

FOREIGN PATENT DOCUMENTS

| | | |
|---|---|---|
| EP | 2 716 086 A1 | 4/2014 |
| EP | 2 759 154 A1 | 7/2014 |
| EP | 2757471 A2 | 7/2014 |
| WO | 2008/016580 A1 | 2/2008 |
| WO | WO2011/123328 A1 | 10/2011 |
| WO | 2012/109751 A1 | 8/2012 |
| WO | 2012/164287 A1 | 12/2012 |
| WO | 2013/041849 A1 | 3/2013 |
| WO | 2014/036296 A1 | 3/2014 |
| WO | 2014/047168 A1 | 3/2014 |
| WO | 2016048414 A1 | 3/2016 |

(56) References Cited

FOREIGN PATENT DOCUMENTS

| WO | 2016048415 A1 | 3/2016 |
|---|---|---|
| WO | 2016048416 A1 | 3/2016 |
| WO | 2016048417 A1 | 3/2016 |

OTHER PUBLICATIONS

Book-Firtman-2010, Author: Firtman, Book Title: Programming the Mobile Web, 2010.*

Chanliau, "Extending Enterprise Access and Governance with Oracle Mobile Security," Oracle Fusion Middleware, An Oracle White Paper, Mar. 2014, 29 pages.

"Can you pre-configure an app before deployment?" Enterprise iOS Forums, http://www.enterpriseios.com/forum/topic/Can_you_pre_configure_an_app_before_deployment, Jan. 25, 2013, 2 pages.

"Complete Mobility Management Solutions of Apple iOS," Apple iOS Device Management, http://www.air-watch.com/solutions/apple-ios/, retrieved Mar. 23, 2015, 5 pages.

"Complete Mobility Management Solutions for Samsung SAFE and KNOX Devices," Samsung for Enterprise (SAFE) Management, http://www.air-watch.com/solutions/android/samsung-for-enterprise/ retrieved Mar. 23, 2015, 4 pages.

"Comprehensive App, Security, Management and Deployment," AirWatch Mobile Application Management, http://www.air-watch.com/solutions/mobile-application-management/, retrieved Mar. 23, 2015, 6 pages.

"Comprehensive Security, Management and User Enablement for Android," AirWatch for Android Devices, http://www.air-watch.com/solutions/android/, retrieved Mar. 23, 2015, 3 pages.

"Configure and enforce policies across compatible IronKey secure USB mobile storage devices," Access Management Software, http://www.ironkey.com/en-us/access/enterprise/, © 2015 Imation Corp., retrieved Mar. 23, 2015, 3 pages.

"Flexible Containerization for Your Mobile Deployment," AirWatch Workspace Management, http://www.air-watch.com/solutions/containerization/, retrieved Mar. 24, 2015, 2 pages.

"Manage Mobile Devices with Configuration Manager and Microsoft Intune," https://technet.microsoft.com/en-us/library/jj884158.aspx, updated Mar. 3, 2015, 5 pages.

"Mobile Device Management for iOS, Android & Windows," Mobile Device Management (MDM), https://www.manageengine.com/products/desktop-central/mobile-device-management-mdm.html, retrieved Mar. 25, 2015, 4 pages.

International Application No. PCT/US2015/026596, International Search Report and Written Opinion mailed on Aug. 14, 2015, 13 pages.

International Search Report for application PCT/US2015/026699 (Aug. 6, 2015), 11 pages.

International Search Report for application PCT/US2015/026594 (Aug. 10, 2015), 15 pages.

International Search Report for application PCT/US2015/026697 (Jul. 24, 2015), 11 pages.

U.S. Appl. No. 14/689,733, Notice of Allowance mailed on Aug. 29, 2016, 5 pages.

U.S. Appl. No. 14/690,034, Final Office Action mailed on Sep. 16, 2016, 12 pages.

International Application No. PCT/US2015/026596, Written Opinion mailed on Aug. 22, 2016, 7 pages.

International Application No. PCT/US2015/026697, International Preliminary Report on Patentability mailed on Sep. 2, 2015, 10 pages.

U.S. Appl. No. 14/689,733, Non-Final Office Action mailed on Jun. 2, 2016, 6 pages.

U.S. Appl. No. 14/690,034, Non-Final Office Action mailed on May 19, 2016, 15 pages.

U.S. Appl. No. 14/689,733, Supplemental Notice of Allowance mailed on Dec. 1, 2016, 2 pages.

U.S. Appl. No. 14/689,983, Non-Final Office Action mailed on Dec. 9, 2016, 5 pages.

U.S. Appl. No. 14/690,034, Notice of Allowance mailed on Jan. 5, 2017, 7 pages.

U.S. Appl. No. 14/690,045, *Ex Parte Quayle* Action mailed on Feb. 24, 2017, 8 pages.

U.S. Appl. No. 14/690,062, Non-Final Office Action mailed on Nov. 10, 2016, 5 pages.

U.S. Appl. No. 14/690,062, Notice of Allowance mailed on Feb. 23, 2017, 8 pages.

U.S. Appl. No. 15/347,152, Non-Final Office Action mailed on Feb. 27, 2017, 7 pages.

International Application No. PCT/US2015/026596, International Preliminary Report on Patentability mailed on Nov. 22, 2016, 11 pages.

International Application No. PCT/US2015/026699, International Preliminary Report on Patentability mailed on Nov. 10, 2016, 9 pages.

U.S. Appl. No. 14/690,045, Notice of Allowance dated Apr. 26, 2017, 5 pages.

U.S. Appl. No. 14/689,983, Notice of Allowance dated May 30, 2017, 5 pages.

International Application No. PCT/US2015/026594, International Preliminary Report on Patentability mailed on Apr. 6, 2017, 13 pages.

* cited by examiner

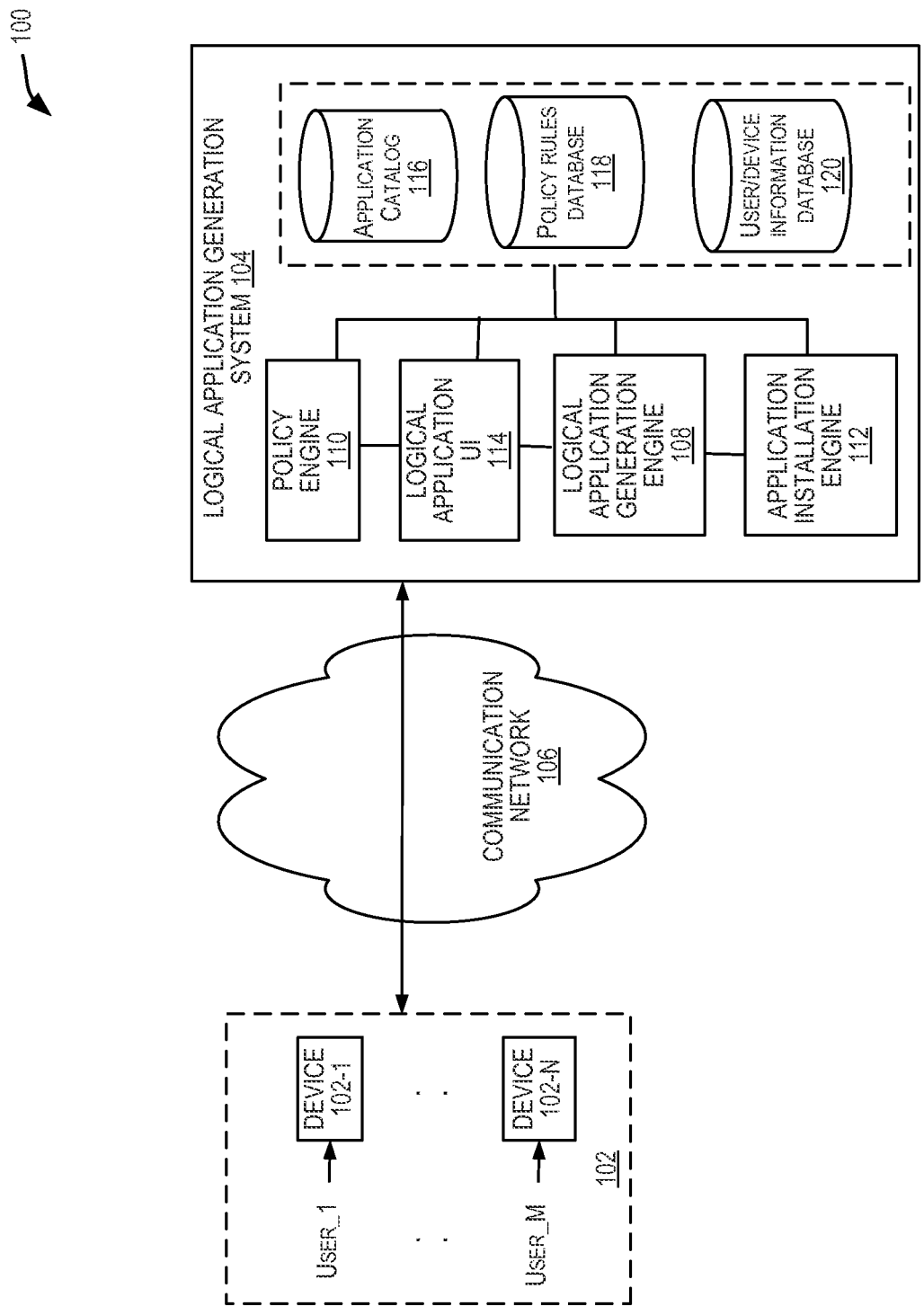

| App ID | App Name | Distributi on ID | App URL | App Type | App Description | App Category | App OS platform | App distribution location | App version | App OS version (min-max range) | App package name |
|---|---|---|---|---|---|---|---|---|---|---|---|
| 1023 | SmartBirds | 001 | http://Sm artBirds.c om | Containerized | SmartBirds | Games | Android® | App Store | 1.5.2 | 5.0.1-6.0 | com.game.birds |
| 1023 | SmartBirds | 002 | http://Sm artBirds.c om | Secure Workspace app | SmartBirds | Games | iOS® | Binary file location | 1.5.2 | 5.0.1-6.0 | com.abc.phone |
| 1023 | SmartBirds | 003 | http://Sm artBirds.c om | Secure Workspace app | SmartBirds | Games | Windows® | Windows Store® location | 1.5.2 | 5.0.1-6.0 | com.abc.phone |

| Add Distribution type-1 | Add Distribution type-2 |

302 — Add Distribution type-1
304 — Add Distribution type-2

App Details

App Type ● App ○ Virtual App
Containerized ○ Yes ● No
☐ Secure Workspace App
* Name [SmartBirds]
Description [SmartBirds]

* Platform [All ▽]
Vendor [        ]
Icon [Choose File] No file chosen

FIG. 3

Distribution-type-1 iOS®

Distribution ● App Store®
Location ○ URL

URL [          ]

○ Binary [Choose File] No file chosen

* App ID [          ]
App URL [          ]
* Package Name [com.game.Birds]
*Version [5.0.1]
Min OS Version [          ]

[Add]

COMPARTMENTALIZING APPLICATION DISTRIBUTION FOR DISPARATE ELECTRONIC DEVICES

CROSS-REFERENCES TO RELATED APPLICATIONS

The present application claims the benefit and priority of U.S. Provisional Application No. 62/054,544, filed Sep. 24, 2014, entitled "Mobile Security Manager (MSM)," the entire contents of which are incorporated herein by reference for all purposes.

BACKGROUND OF THE INVENTION

The present disclosure relates generally to managing applications for various types of electronic devices. More particularly, techniques are disclosed for compartmentalizing the distribution of an application for disparate electronic devices.

An application generally refers to a program designed to perform a specific function for a user of an electronic device such as a personal computer, a desktop, a mobile or handheld device such as a laptop, a Smartphone, a tablet and the like. Examples of applications may include word processors, database programs, Web browsers, developmental tools, communication programs and the like. An application typically uses the services of a device's operating system to perform its intended function. An application may be pre-loaded onto a device or be downloaded by a user of the device from the Internet or an online store that enables the user browse and download the application.

Applications are typically available through various application platforms that provide services to applications. Services provided by an application platform may include, for example, operating system services to execute the application, data services to allow an application to store and process data, developmental tools which help create and maintain the application, and so on. As such, finding improved ways of managing an application on an electronic device is desired.

BRIEF SUMMARY OF THE INVENTION

Generally, techniques for easing application distribution of different types of electronic devices are disclosed. These techniques provide (e.g., a method, a system, non-transitory computer-readable medium storing code or instructions executable by one or more processors) for generating a logical application. A logical application can run separate commands through a single interface, lessening the number of connections needed between different user's electronic devices (e.g., smart phones, tablets, workstations, wearable computers) and a company's various servers. In certain embodiments, a logical application may refer to a grouping of multiple physical distributions of an application for programming the devices. Applications may include, without limitation, web browsers, word processors, email programs, database software, presentation software, game applications, messaging applications, and the like. In some examples, the multiple physical distributions of a logical application may correspond to different operating system (OS) versions of the application. For instance, different OS versions of an application may include an Android® version of the application, an iOS® version of the application, a Windows® version of the application, and the like. Compiled code for each of these operating systems and device types is controlled and assigned to select users' devices from vastly different distribution architectures.

In accordance with some embodiments, a method for generating a logical application is disclosed. The method includes receiving a first resource locator for a first binary file of an application. In some examples, the first resource locator may point to a first distribution location (e.g., a uniform resource locator (URL)) of a first binary file of the application. The first binary file of the application may correspond to a particular physical distribution (e.g., OS version) of the application. For instance, the first binary file may correspond to an Android® OS version of the application.

In some embodiments, the method then includes generating a first set of entries in a first database record for the first resource locator and assigning a first operating system version of a first device to the first set of entries. For instance, the first set of entries may correspond to a URL distribution location of an Android® version of the application.

In some embodiments, the method may include receiving a property-list (p-list) metadata file for a second binary file for the application. In some examples, the property-list metadata file may point to a property-list location (e.g., a p-list file) of a second binary file of the application. The second binary file of the application may correspond to a particular physical distribution (e.g., OS version) of the application. For instance, the second binary file may correspond to an iOS® version of the application.

In some embodiments, the method may include generating a second set of entries in a second database record for the property-list metadata file and assigning a second operating system version of a second device to the second set of entries. For instance, the second set of entries may correspond to a '.plist' distribution location of an iOS® version of the application.

In some embodiments, the method may include presenting a user interface having a first user interface element linked to the first set of entries and a second user interface element linked to the second set of entries. The first user interface element may be presented in a first tab of the multiple tab interface and the second user interface element may be presented on a second tab of the multiple tab interface. In some embodiments, the method may include generating a logical application based on the first set of entries and the second set of entries.

In some embodiments, the first set of entries comprises a minimum operating system version and a maximum operating system version of the first operating system platform of the first device and the second set of entries comprises a minimum operating system version and a maximum operating system version of the second operating system platform of the second device.

In some embodiments, a type of the first operating system version or a type of the second operating system version is selected from the group consisting of an iOS® version, an Android® operating system version and a Windows® operating system version. In some embodiments, a type of a first device or the second device is selected from the group consisting of a workstation, a personal computer, a tablet computer, a mobile device and a wearable device.

In some embodiments, the method includes determining a first version of the logical application to install on the first device and causing an installation of the first version (e.g., a first physical distribution) of the logical application on the first device. In some embodiments, the method includes determining a second version of the logical application to install on the second device and causing an installation of the second version (e.g., a second physical distribution) of the logical application on the second device. In some embodiments, the method includes causing the first version of the logical application to be downloaded to the first device and causing the second version of the logical application to be downloaded to the second device.

The foregoing, together with other features and embodiments will become more apparent upon referring to the following specification, claims, and accompanying drawings.

BRIEF DESCRIPTION OF THE DRAWINGS

FIG. 1 depicts a simplified high-level diagram of a computing environment 100 in accordance with certain embodiments of the present invention.

FIG. 2 is an exemplary illustration of a logical application, in accordance with an embodiment of the present invention.

FIG. 3 illustrates an example graphical user interface for generating a logical application, described herein.

FIG. 4 illustrates an example graphical user interface for providing a first set of entries for a first physical distribution of a logical application, described herein.

DETAILED DESCRIPTION OF THE INVENTION

Figure 5:
FIG. 5 illustrates an example graphical user interface for providing a second set of entries for a second physical distribution of a logical application, described herein

In the following description, for the purposes of explanation, specific details are set forth in order to provide a thorough understanding of embodiments of the invention. However, it will be apparent that various embodiments may be practiced without these specific details. The figures and description are not intended to be restrictive.

In accordance with some aspects, a logical application generation system is disclosed. In some embodiments, the logical application generation system is configured to generate a logical application. A logical application can run separate commands through a single interface, lessening the number of connections needed between different user's electronic devices (e.g., smart phones, tablets, workstations, wearable computers) and a company's various servers. As noted above, a logical application may refer to a grouping of multiple physical distributions of an application for programming the devices. For example, the multiple physical distributions of a logical application may correspond to different OS versions of the application. For instance, a logical application may include an Android® version of the application, an iOS® version of the application, a Windows® OS version of the application, and so on. Compiled code for each of these operating systems and device types is controlled and assigned to select users' devices from vastly different distribution architectures. For instance, a user's device may be assigned a binary distribution of an application located at a remote location (e.g., an App Store location) which may controlled by a license. In some embodiments, a logical application may be generated via a user interface displayed in a browser application of the logical application generation system.

In certain embodiments, the logical application generation system may be configured to identify a policy associated with a user of the device and define an application catalog for the user's device based on the policy. In some examples, the user policy may define a set of entitlements granted to the user for a set of applications defined in the application catalog. An entitlement may enable the user to perform a specific task(s) or function(s) associated with an application. In some embodiments, an entitlement may be a privilege or a set of privileges that can be granted to a user that governs the user's access to a set of applications stored in the application catalog. An entitlement can be of various types including without limitation a role, a responsibility, a group membership, and the like. In some examples, the set of entitlements may be expressed as a set of polices in the logical application.

In certain embodiments, the logical application generation system may be configured to determine a particular version (i.e., physical distribution) of the logical application to be installed to the device based on the OS of the device. For instance, the device may include a personal computer, a desktop, a mobile or handheld device such as a laptop, a smart phone, a tablet, and the like. The logical application generation system may then be configured to cause the installation of the appropriate version (i.e., physical distribution) of the logical application on the device.

The generation of a logical application in accordance with embodiments of the present invention eliminates the need to generate separate application definitions and/or instances for different physical distributions (e.g., different OS versions) of the application. A single logical application can be added to a device's application catalog instead of adding individual application names corresponding to different OS versions of the application. A user can install an appropriate version of the logical application directly from the application catalog instead of having to make a selection of a particular version of the application to download from a list of available application distributions. Further, each physical distribution of the application can be updated independently of each other in the logical application. For instance, an Information technology (IT) department within an enterprise may wish to provide an update to an Android® version of the application that is assigned to a set of employees within the enterprise independently of an iOS® version update of the application that is assigned to a set of contractors within the enterprise. When an update to a particular OS version of the application is received by the system, a particular user and/or group of users having the particular version of the logical application installed on their devices can be notified and the update can be pushed to the identified devices. In addition, the set of user policies defined in the logical application need not be separately updated when a new physical distribution (version) of the application is added to the logical application.

FIG. 1 depicts a simplified high-level diagram of a computing environment 100 in accordance with certain embodiments of the present invention. As shown, computing environment 100 includes one or more remote devices 102(1)-102(N) (collectively, devices 102) communicatively coupled to a logical application generation system 104 via a communication network 106. In some embodiments, logical application generation system 104 may be configured to compartmentalize the different physical distributions of an application by grouping the multiple physical distributions of the application into a single logical application. As described herein, an 'application' may refer to any software program executed by device 102. Applications may include, without limitation, web browsers, word processors, email programs, database software, presentation software, game applications, messaging applications, and the like. As noted above, the multiple physical distributions of the application may correspond to different OS versions of the application. For instance, OS versions of an application may include an Android® version of the application, an iOS® version of the application and a Windows® version of the application. In some examples, logical application generation system 104 may be implemented as a subsystem within an enterprise. In other examples, logical application generation system 104 may also be implemented as its own stand-alone service that provides services to compartmentalize the distribution of an application into a logical application, for an enterprise.

In some examples, devices 102 may include devices associated with users (e.g., User_1 . . . User_M). For instance, devices 102 may be of various types, including, but not limited to, a personal computer, a desktop, a mobile or handheld device such as a laptop, a smart phone, a tablet, and the like. Devices may also include endpoint devices, such as a workspace executing on another device. A workspace may be a controlled environment to provide access to enterprise data and applications on a device running the workspace. For example, a secure container application may run on device 102. Devices 102 may also include, without limitation, devices (e.g., a corporate device) issued by an enterprise or a user's personal device (e.g., "bring your own device," (BYOD)).

Communication network 106 facilitates communications between devices 102 and logical application generation system 104. Communication network 106 can be of various types and can include one or more communication networks. For example, communication network 106 can include, without limitation, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as WebSockets that provide a full-duplex communication channel over a single TCP connection, IEEE 802.XX suite of protocols, TCP/IP, IPX, SAN, AppleTalk, Bluetooth, and other protocols. In general, communication network 106 may include any communication network or infrastructure that facilitates communications between devices 102 and logical application generation system 104.

In the embodiment depicted in FIG. 1, logical application generation system 104 includes a logical application generation engine 108, a policy engine 110, application installation engine 112 and a logical application User Interface (UI) 114. Logical application generation engine 108, policy engine 110, application installation engine 112 and logical application UI 114 may be implemented as general purpose computers, specialized server computers, server farms, server clusters, software components executed by one or more processors or any other appropriate arrangement and/or combination. The various components of logical application generation system 104 are meant for illustrative purposes only and are not intended to limit the scope of embodiments of the present invention. Alternative embodiments may include more or fewer components and/or more or fewer devices than those shown in FIG. 1.

In some embodiments, logical application generation engine 108 may be configured to generate a logical application for an application executing on device 102. In some examples, a logical application may be implemented as a data structure comprising a set of one or more entries. The data structure may be implemented as one or a combination of different types of data structures including, without limitation, an array, a record, a relational database table, a hash table, a linked list, or other types of data structures. An exemplary data structure for a logical application is shown in FIG. 2.

In some examples, the set of one or more entries in a logical application may include information that relate to different OS versions of an application. For instance, a first set of entries in a logical application may include information related to an Android® version of the application, the second set of entries in the logical application may include information related to an iOS® version of the application, the third set of entries in the logical application may include information related to a Windows® OS version of the application, and so on. In some examples, the logical application may be implemented as a database table having a set of database records, wherein the first set of entries correspond to a first database record in the database table, the second set of entries correspond to a second database record in the database table and the third set of entries correspond to a third database record in the database table.

In some embodiments, the logical application may be generated via a logical application user interface (UI) 114. For instance, a user (e.g., an administrator) of logical application generation system 104 may interact with logical application UI 114 to generate a logical application. In some examples, logical application UI 114 may be displayed in a browser application in the logical application generation system and the administrator may interact with the logical application UI to generate the logical application. FIGS. 3 and 4 illustrate the generation of a logical application via logical application UI 114.

In accordance with some embodiments, logical application UI 114 may receive a first resource locator for a first binary file of the application. For instance, the first resource locator may be a URL location of an Android® version of the application. Logical application generation engine 108 may be configured to generate a first set of entries in the logical application, for the first resource locator. In some examples, logical application generation engine 108 may assign a first OS version of a first device to the first set of entries. For instance, the first set of entries may include information related to an Android® OS version of the application.

In some examples, logical application UI 114 may receive a property-list metadata file for a second binary file for the application via logical application UI 114. For instance, the property-list (p-list) metadata file may include a URL location of an iOS® version of the application. A property-list metadata file may be an XML file or a binary file that stores data related to the application. The logical application definition engine 108 may be configured to generate a second set of entries in the logical application, based on the property-list metadata file. In some examples, the logical application generation engine 108 may assign a second OS platform of a second device to the second set of entries. For instance, the second set of entries may include information related to an iOS® platform version of the application.

In some examples, logical application UI 114 may receive a Windows Store® location for a third binary file for the application. For instance, the Windows Store® location may include a URL location of a Windows® version of the application. The logical application definition engine 108 may be configured to generate a third set of entries in the logical application, for the Windows Store® location. In some examples, the logical application generation engine 108 may assign a third OS platform of a third device to the second set of entries. For instance, the third set of entries may include information related to a Windows® platform version of the application. Although the above discussion relates to generating a logical application having a first, second and a third set of entries, a logical application can be generated with more or fewer sets of entries, in other embodiments.

In some embodiments, logical application UI 114 may receive additional information about a particular physical distribution of the application. The additional information may include, for instance, a minimum and maximum OS version of a particular physical distribution of the application, the name of the application, the category of the application, a description of the application, the name of the vendor associated with the application, the version of the application, an icon representing the application, a URL of the application, an application type, a time of creation of the application and the like. In some embodiments, logical application generation engine 108 may be configured to generate the logical application using this additional information. In some examples, the logical application, thus generated, may be stored in an application catalog 116.

In some embodiments, logical application generation system 104 may include a user/device information database 120. In some examples, user/device information database 120 may store information about users and devices associated with users, including, for example, a type of operating system on the remote device, a version of the operating system, a host identifier if the remote device is hosted on another device, a device type, IMEI number, a model of the remote device, a service provider (e.g., a carrier) of the remote device, a device name, a device state, or other information about the remote device.

In some examples, logical application generation system 104 may include a policy rules database 118. Policy rules database may be configured to store a set of policies associated with users of devices. For instance, user policies may relate to a role or responsibility of a user associated with a device. As an example, a role or responsibility of a user may be one which is defined by an enterprise. For instance, a user may have an 'Administrator' role, a 'Manager' role, a 'Sales Analyst' role and so on within the enterprise. A role may define an access policy for the user that includes, for example, a particular type of device that the user is allowed to use, the particular type of applications that may be installed by the user on the user's device, and so on. As noted above, in some embodiments, logical application generation system may be configured to define an application catalog for the user's device based on the user policy.

In some embodiments, application installation engine 112 may be configured to install a particular version (i.e., physical distribution) of the logical application on device 102. For instance, application installation engine 112 may apply additional criteria to determine the particular version of the logical application to be installed on device 102. The additional criteria may include, for example, determining the OS of the device, determining that a particular version of the OS supported by device 102 is within a minimum and maximum range of a particular version (Android®, iOS®, Windows® and the like) of the logical application and the like. For example, if device 102 supports an iOS® 8.1.2 mobile OS, then application installation engine 112 may determine that an iOS® version of the logical application that is within a minimum and maximum range of the device's OS should be installed on device 102. The additional criteria may also include determining the different types of distribution locations (e.g., binary, URL, App Store®) that the device can install the application from, and so on.

If the device satisfies the additional criteria, then, in some examples, application installation engine 112 may be configured to install the particular version of the logical application on device 102. In some examples, application installation engine 112 may be configured to initiate the installation of a particular version of the logical application on device 102 by transmitting a push notification event to device 102. In some examples, the push notification may be a message that is sent to device 102 with a link that enables a user of device 102 to install the particular version of the logical application on device 102. User of device 102 may interact with the message to install the particular version of the logical application on device 102. In some examples, application installation engine 112 may be configured to transmit a push notification event to device 102 to indicate that a particular version of the logical application has been added to an application catalog in device 102 and device 102 may install the particular version of the logical application from the application catalog.

FIG. 2 is an exemplary illustration of a logical application, in accordance with an embodiment of the present invention. The embodiment shown in FIG. 2 illustrates a logical application generated for a "SmartBirds" game application. In an example, the logical application may be implemented as a data structure 200 comprising a set of one or more entries that relate to different physical distributions of the application. In the example shown in FIG. 2, data structure 200 is a database table with a set of one or more database records. A first database record in the database table may include information related to a first set of entries associated with the logical application. For instance, the first set of entries may correspond to an Android® version of the "SmartBirds" game application. A second database record may include information related to a second set of entries associated with the logical application. For instance, the second set of entries in the logical application may include information related to an iOS® version of the application. A third database record may include information related to a third set of entries associated with the logical application. For instance, the third set of entries in the logical application may include information related to a Windows® OS version of the application, and so on. Although the illustrated example shows an implementation of logical application as a database table with three database records or rows, logical application may be implemented as a database table with fewer or more database records, in other embodiments.

As further illustrated, the different sets of entries (first, second, third) may include additional information related to each version of the application. The additional information may include, for example, an application identifier, a distribution identifier, an application name, an application type, an application description, an application category, an application OS platform (e.g., Android®, iOS®, Window® and the like), an application distribution location (e.g., URL, binary, App Store®, Windows Store® and the like), an application version, a minimum application OS platform version, a maximum application OS platform version, an application package name, and the like.

In some embodiments, the logical application may be implemented as a database schema of entries as follows:

```
Begin
    sqlstr := 'create table app_distributions
        (
            app_id number,
            distribution_id number,
            appstore_name varchar2(100 char),
            appstore_id varchar2(255 char),
            platform varchar2(50 char) not null,
            license_key varchar2(512 char),
            max_version varchar2(50 char),
            min_version varchar2(50 char),
            url varchar2(2048 char),
            version varchar2(50 char) not null,
            package_name varchar2(100 char) not null,
            icon blob,
            binary blob,
                length number default 0,
            app_dist_type varchar2(50 char) not null,
            reference_count number default 0 not null,
            created_by varchar2(100 char) not null,
            created_time timestamp default systimestamp,
            updated_by varchar2(100 char) not null,
            updated_time timestamp default systimestamp,
            constraint app_distributions_pk primary key
            (distribution_id) enable,
            constraint app_distributions_uk1 unique (app_id,
            platform) enable,
            constraint app_distributions_fk1 foreign key(app_id)
references apps(id) on delete cascade enable
        )';
    execute immediate sqlstr;
    dbms_output.put_line('table app_distributions is created
    successfully.');
end;
```

As noted above, and as further illustrated in FIGS. 3 and 4, in some embodiments, a logical application may be generated as a result of a user's interaction with logical application user interface (UI) 114 in the logical application generation system.

FIG. 3 illustrates an example graphical user interface for generating a logical application, described herein. In FIG. 3, the example environment 300 may be a graphical user interface provided by logical application UI 114 viewable via a browser application in the logical application generation system. In the example illustrated in FIG. 3, a user may provide information related to the application, such as the particular type of the application, the name of the application, a description of the application and the like. In addition, a user may choose a particular OS platform (e.g., Android®, iOS®, Window®, and the like) of the application, an application vendor and an icon to display the application.

In certain embodiments, graphical user interface 300 may include a first user interface element 302 in a first tab of the user interface and a second user interface element 304 in a second tab of the user interface. In an example, user interface elements 302, 304 may indicate different distribution locations (e.g., URL, binary, App Store®, Windows Store® and the like) of the application. For instance, a user may select first user interface element 302 to provide a first set of entries for a first distribution location (e.g., App Store®) location of the application (as shown in FIG. 4) and a second user interface element 304 to provide a second set of entries for a second distribution location (e.g., Binary file) location of the application (as shown in FIG. 5).

FIG. 4 illustrates an example graphical user interface for providing a first set of entries for a first physical distribution of a logical application, described herein. In FIG. 4, the example environment 400 may be a graphical user interface provided by logical application UI 114 viewable via a browser application in the logical application generation system. In the example illustrated in FIG. 4, a user may provide information related to a first set of entries for an App Store® location of the application. This information may include, for example, the particular distribution location where the application is available, an application identifier, a URL of the application, a package name associated with the application, a version of the application and a minimum OS version of the application.

FIG. 5 illustrates an example graphical user interface for providing a second set of entries for a second physical distribution of a logical application, described herein. In FIG. 5, the example environment 500 may be a graphical user interface provided by logical application UI 114 viewable via a browser application in the logical application generation system. In the example illustrated in FIG. 5, a user may provide information related to a second set of entries for an Android® location of the application. This information may include, for example, the particular distribution location (e.g., binary file) of the application, an application name, an application type, an application icon, a package name associated with the application, a version of the application and a minimum and maximum OS version of the application.

Figure 6:
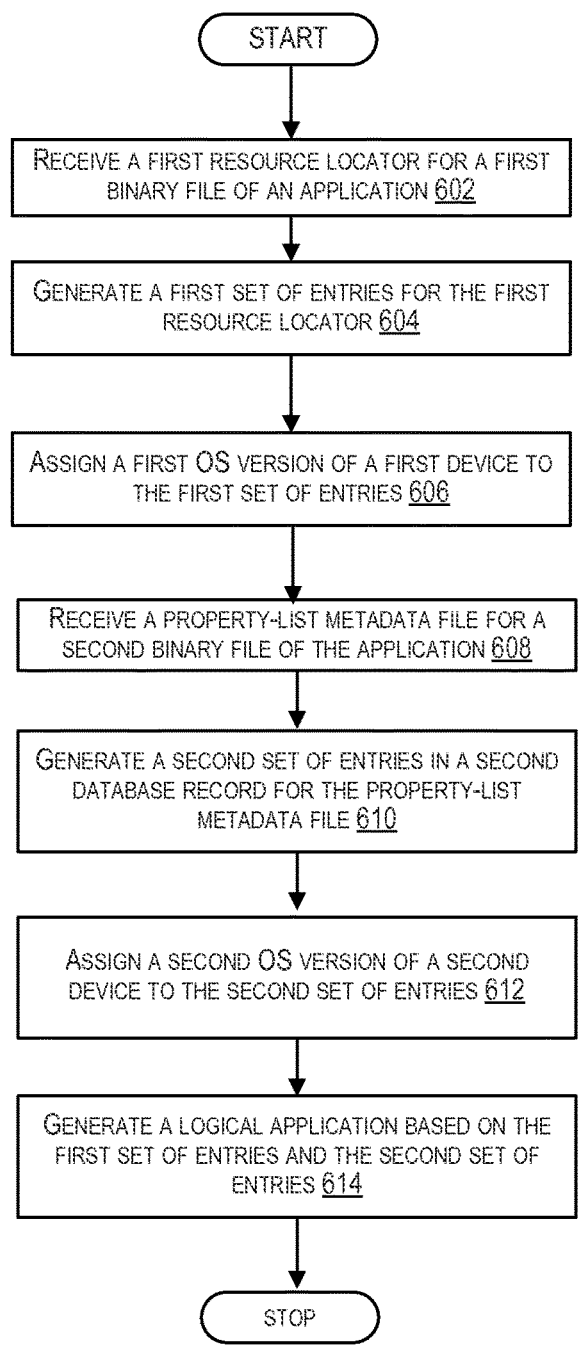
FIG. 6 illustrates a flow diagram of an example process 600 for generating a logical application, described herein.
Figure 7:
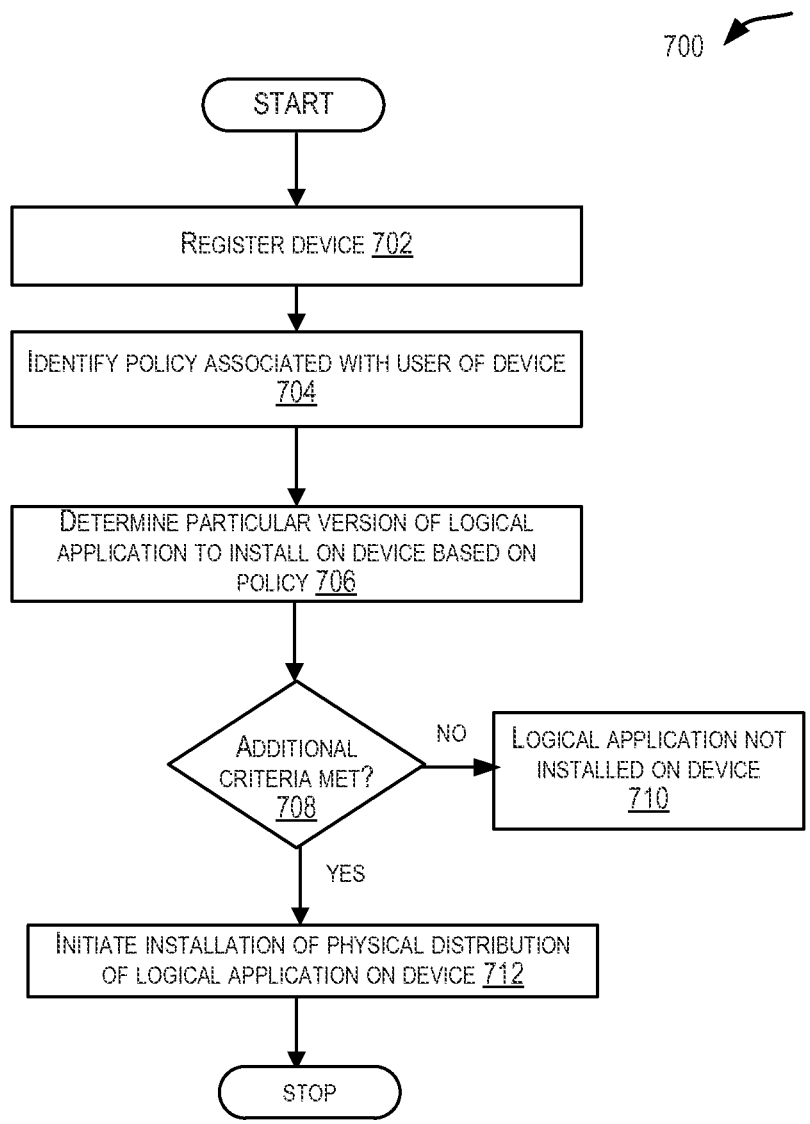
FIG. 7 illustrates a flow diagram of an example process 700 for installing a logical application on a device, described herein.

FIGS. 6-7 illustrate example flow diagrams showing respective processes 600 and 700 for generating a logical application according to certain embodiments of the present invention. These processes are illustrated as logical flow diagrams, each operation of which that can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory. In some examples, logical application generation system 104 (e.g., utilizing at least the policy engine, the logical application UI, the logical application generation engine and the application installation engine) shown in at least FIG. 1 may perform the processes 600 and 700 of FIGS. 6-7 respectively.

FIG. 6 illustrates a flow diagram of an example process 600 for generating a logical application, described herein. The process at 600 may begin at 602 when logical application generation engine (e.g., 108) receives a first resource locator for a first binary file of an application via logical application UI (e.g., 114). As noted above, the first resource locator may point to a first distribution location (e.g., a uniform resource locator (URL)) of a first binary file of the application. The first binary file of the application may correspond to a particular physical distribution (e.g., OS platform version) of the application. For instance, the first binary file may correspond to an Android® OS version of the application.

At 604, the logical application generation engine generates a first set of entries in a first database record for the first resource locator. At 606, the logical application generation engine assigns a first OS version of a first device to the first set of entries. For instance, the first set of entries may correspond to a URL distribution location of an Android® version of the application.

In some embodiments, at 608, the logical application generation engine may receive a property-list (p-list) metadata file for a second binary file for the application. As noted above, the property-list metadata file may point to a property-list location (e.g., a p-list file) of a second binary file of the application. The second binary file of the application may correspond to a particular physical distribution (e.g., OS platform version) of the application. For instance, the second binary file may correspond to an iOS® version of the application.

At 610, the logical application generation engine may generate a second set of entries in a second database record for the property-list metadata file. At 612, the logical application generation engine may assign a second operating system version of a second device to the second set of entries. For instance, second first set of entries may correspond to a '.plist' distribution location of an iOS® version of the application. At 614, the logical application generation engine may generate a logical application based on the first set of entries and the second set of entries. As noted above, in some embodiments, the logical application may be implemented as a database table having a set of database records, wherein the first set of entries correspond to a first database record in the database table, the second set of entries correspond to a second database record in the database table and the third set of entries correspond to a third database record in the database table.

FIG. 7 illustrates a flow diagram of an example process 700 for installing a logical application on a device, described herein. The process at 700 may begin at 702 when logical application generation system registers a device (e.g., 102) in the communication network. For instance, the device may be registered based on information about the device stored in the user/device information database 120. At 704, the application installation engine may identify a policy associated with a user of the device. As noted above, a user policy may relate to a role or responsibility of a user associated with a device. At 706, the application installation engine may determine a particular version of the logical application to be installed in the device by applying additional criteria. As noted above, the additional criteria may include for example, determining the OS of the device, determining that a particular version of the OS supported by the device is within a minimum and maximum range of a particular version (Android®, iOS®, Windows® and the like) of the logical application, determining the different types of distribution locations (e.g., binary, URL, App Store®) that the device can install the application from, and so on.

At 708, the application installation engine determines if the additional criteria are met. If the additional criteria are not met, then the particular version of the logical application is not installed on the device at 710. If the additional criteria are met, then, in some embodiments, the application installation engine is configured to initiate the installation of the particular version of the logical application on the device.

Figure 8:
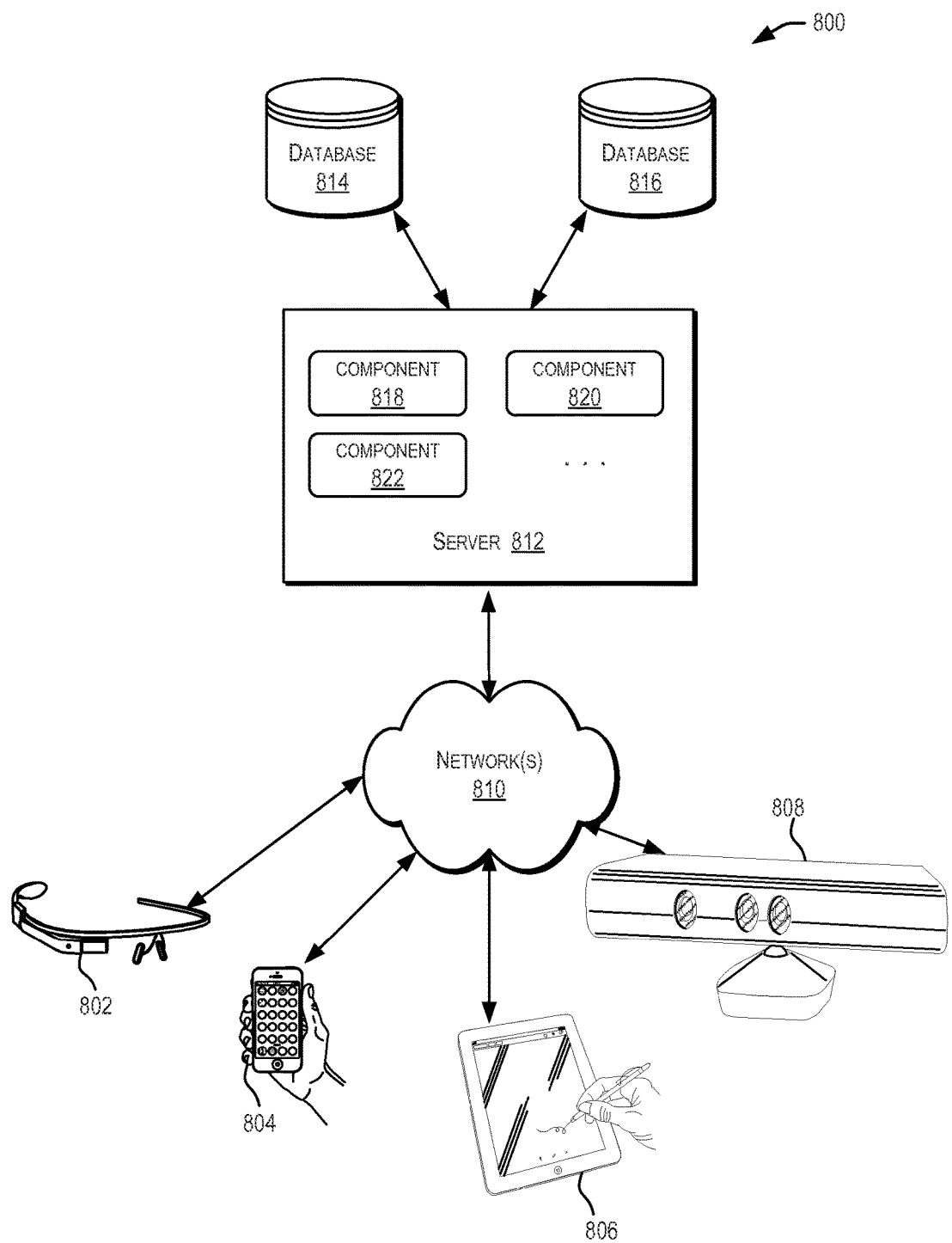
FIG. 8 depicts a simplified diagram of a distributed system 800 for implementing an embodiment.

FIG. 8 depicts a simplified diagram of a distributed system 800 for implementing an embodiment. In the illustrated embodiment, the distributed system 800 includes one or more client computing devices 802, 804, 806, and 808, which are configured to execute and operate a client application such as a web browser, proprietary client (e.g., Oracle Forms), or the like over one or more network(s) 810. The server 812 may be communicatively coupled with the remote client computing devices 802, 804, 806, and 808 via network 810.

In various embodiments, the server 812 may be adapted to run one or more services or software applications such as services and applications that provide the compartmentalization of the distribution of an application. In certain embodiments, the server 812 may also provide other services or software applications can include non-virtual and virtual environments. In some embodiments, these services may be offered as web-based or cloud services or under a Software as a Service (SaaS) model to the users of the client computing devices 802, 804, 806, and/or 808. Users operating the client computing devices 802, 804, 806, and/or 808 may in turn utilize one or more client applications to interact with the server 812 to utilize the services provided by these components.

In the configuration depicted in FIG. 8, the software components 818, 820 and 822 of system 800 are shown as being implemented on the server 812. In other embodiments, one or more of the components of the system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in FIG. 8 is thus one example of a distributed system for implementing an embodiment system and is not intended to be limiting.

The client computing devices 802, 804, 806, and/or 808 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 810.

Although distributed system 800 in FIG. 8 is shown with four client computing devices, any number of client computing devices may be supported. Other devices, such as devices with sensors, etc., may interact with the server 812.

The network(s) 810 in the distributed system 800 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 810 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 812 can include one or more virtual machines running virtual operating systems, or other computing architectures involving virtualization. One or more flexible pools of logical storage devices can be virtualized to maintain virtual storage devices for the server. Virtual networks can be controlled by the server 812 using software defined networking. In various embodiments, the server 812 may be adapted to run one or more services or software applications described in the foregoing disclosure. For example, the server 812 may correspond to a server for performing processing as described above according to an embodiment of the present disclosure.

The server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 812 may include one or more applications to analyze and consolidate data feeds and/or event updates received from users of the client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. The server 812 may also include one or more applications to display the data feeds and/or real-time events via one or more display devices of the client computing devices 802, 804, 806, and 808.

The distributed system 800 may also include one or more databases 814 and 816. These databases may provide a mechanism for storing information such as application information, and other information used by embodiments of the present invention. Databases 814 and 816 may reside in a variety of locations. By way of example, one or more of databases 814 and 816 may reside on a non-transitory storage medium local to (and/or resident in) the server 812. Alternatively, the databases 814 and 816 may be remote from the server 812 and in communication with the server 812 via a network-based or dedicated connection. In one set of embodiments, the databases 814 and 816 may reside in a storage-area network (SAN). Similarly, any necessary files for performing the functions attributed to the server 812 may be stored locally on the server 812 and/or remotely, as appropriate. In one set of embodiments, the databases 814 and 816 may include relational databases, such as databases provided by Oracle, that are adapted to store, update, and retrieve data in response to SQL-formatted commands.

Figure 9:
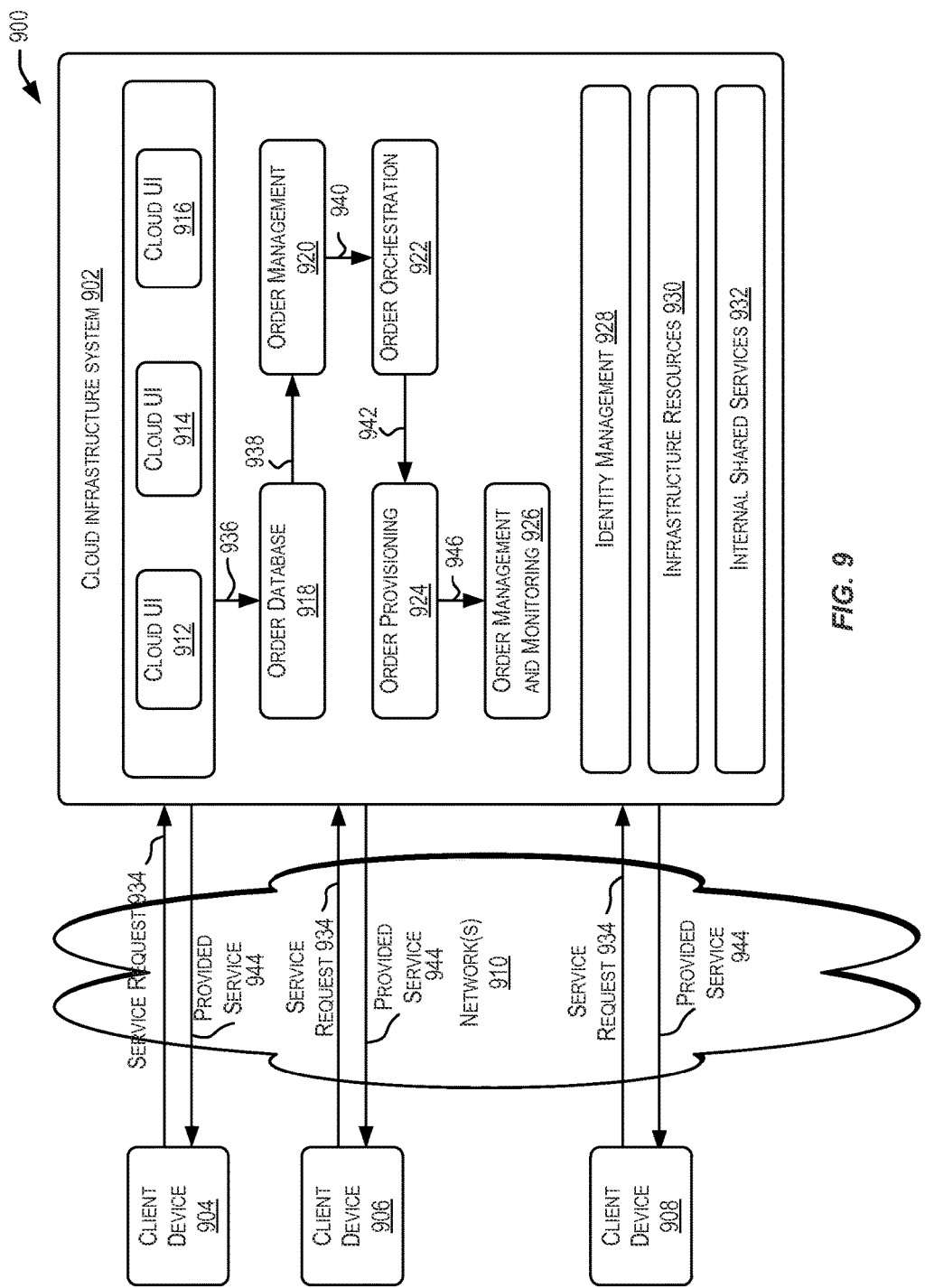
FIG. 9 is a simplified block diagram of one or more components of a system environment 900 in which services may be offered as cloud services, in accordance with an embodiment of the present disclosure.

In some embodiments, the device enrollment services described above may be offered as services via a cloud environment. FIG. 9 is a simplified block diagram of one or more components of a system environment 900 in which services may be offered as cloud services, in accordance with an embodiment of the present disclosure. In the illustrated embodiment in FIG. 9, system environment 900 includes one or more client computing devices 904, 906, and 908 that may be used by users to interact with a cloud infrastructure system 902 that provides cloud services, including services for the compartmentalization of the distribution of an application. Cloud infrastructure system 902 may comprise one or more computers and/or servers that may include those described above for server 812.

It should be appreciated that cloud infrastructure system 902 depicted in FIG. 9 may have other components than those depicted. Further, the embodiment shown in FIG. 9 is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808. Client computing devices 904, 906, and 908 may be configured to operate a client application such as a web browser, a proprietary client application (e.g., Oracle Forms), or some other application, which may be used by a user of the client computing device to interact with cloud infrastructure system 902 to use services provided by cloud infrastructure system 902. Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 1210.

In certain embodiments, services provided by cloud infrastructure system 902 may include a host of services that are made available to users of the cloud infrastructure system on demand. In addition to services related to application management, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 902 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 902 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle Corporation) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 902 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 902 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform, and other resources.

In some embodiments, resources in cloud infrastructure system 902 may be shared by multiple users and dynamically re-allocated per demand. Additionally, resources may be allocated to users in different time zones. For example, cloud infrastructure system 902 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 to enable provision of services by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in FIG. 9, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In an exemplary operation, at 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI) such as cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

At 936, the order information received from the customer may be stored in an order database 918. If this is a new order, a new record may be created for the order. In one embodiment, order database 918 can be one of several databases operated by cloud infrastructure system 918 and operated in conjunction with other system elements.

At 938, the order information may be forwarded to an order management module 920 that may be configured to perform billing and accounting functions related to the order, such as verifying the order, and upon verification, booking the order.

At 940, information regarding the order may be communicated to an order orchestration module 922 that is configured to orchestrate the provisioning of services and resources for the order placed by the customer. In some instances, order orchestration module 922 may use the services of order provisioning module 924 for the provisioning. In certain embodiments, order orchestration module 922 enables the management of business processes associated with each order and applies business logic to determine whether an order should proceed to provisioning.

As shown in the embodiment depicted in FIG. 9, at 942, upon receiving an order for a new subscription, order orchestration module 922 sends a request to order provisioning module 924 to allocate resources and configure resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. This enables order orchestration module 924 to be isolated from implementation details, such as whether or not services and resources are actually provisioned on the fly or pre-provisioned and only allocated/assigned upon request.

At 944, once the services and resources are provisioned, a notification may be sent to the subscribing customers indicating that the requested service is now ready for use. In some instance, information (e.g. a link) may be sent to the customer that enables the customer to start using the requested services.

At 946, a customer's subscription order may be managed and tracked by an order management and monitoring module 926. In some instances, order management and monitoring module 926 may be configured to collect usage statistics regarding a customer use of subscribed services.

For example, statistics may be collected for the amount of storage used, the amount data transferred, the number of users, and the amount of system up time and system down time, and the like.

In certain embodiments, cloud infrastructure system 900 may include an identity management module 928 that is configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
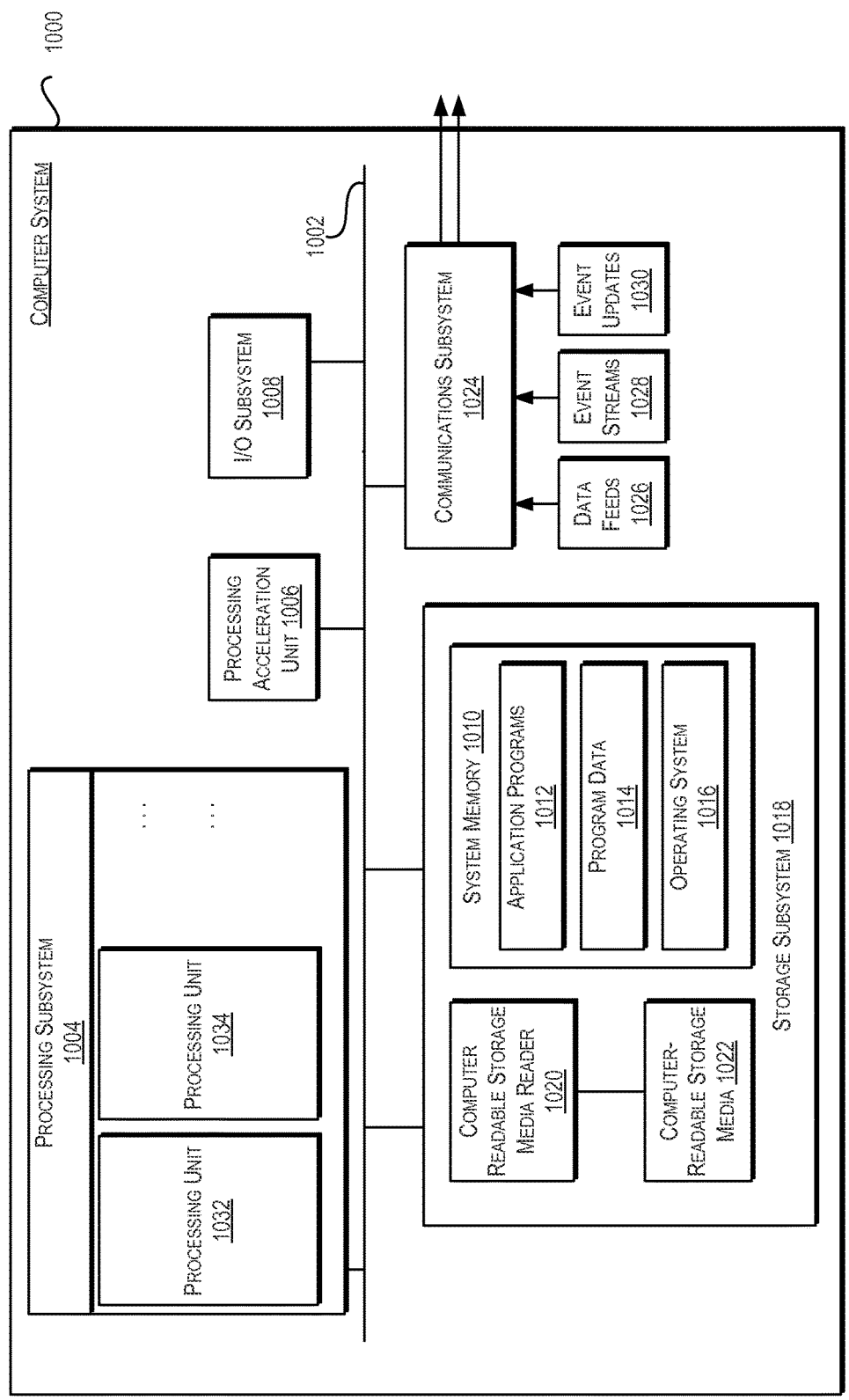
FIG. 10 illustrates an exemplary computer system 1000 that may be used to implement an embodiment of the present invention.

FIG. 10 illustrates an exemplary computer system 1000 that may be used to implement an embodiment of the present invention. In some embodiments, computer system 1000 may be used to implement any of the various servers and computer systems described above. As shown in FIG. 10, computer system 1000 includes various subsystems including a processing subsystem 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 may include tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processing units 1032, 1034, etc. A processing unit may include be one or more processors, including single core or multicore processors, one or more cores of processors, or combinations thereof. In some embodiments, processing subsystem 1004 can include one or more special purpose co-processors such as graphics processors, digital signal processors (DSPs), or the like. In some embodiments, some or all of the processing units of processing subsystem 1004 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1010 including potentially on one or more storage devices. Through suitable programming, processing subsystem 1004 can provide various functionalities described above for generating a logical application.

In certain embodiments, a processing acceleration unit 1006 may be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term "input device" is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information that is used by computer system 1000. Storage subsystem 1018 provides a tangible non-transitory computer-readable storage medium for storing the basic programming and data constructs that provide the functionality of some embodiments. Software (programs, code modules, instructions) that when executed by processing subsystem 1004 provide the functionality described above may be stored in storage subsystem 1018. The software may be executed by one or more processing units of processing subsystem 1004. Storage subsystem 1018 may also provide a repository for storing data used in accordance with the present invention.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM) or dynamic random access memory (DRAM).

By way of example, and not limitation, as depicted in FIG. 10, system memory 1010 may store application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1022 may store programming and data constructs that provide the functionality of some embodiments. Software (programs, code modules, instructions) that when executed by processing subsystem 1004 a processor provide the functionality described above may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1022 may provide storage of computer-readable instructions, data structures, program modules, and other data for computer system 1000.

In certain embodiments, storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for storing computer-readable information.

In certain embodiments, computer system 1000 may provide support for executing one or more virtual machines. Computer system 1000 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1000. Accordingly, multiple operating systems may potentially be run concurrently by computer system 1000. Each virtual machine generally runs independently of the other virtual machines.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, communications subsystem 1024 may receive input communication in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method for grouping two or more physical distributions of an application into a logical application for disparate electronic devices, the method comprising:
   defining a data structure for a logical application in a database table, the data structure comprising multiple records;
   receiving a first resource locator for a first binary file of an application, the first binary file including executable code enabled to execute on a first operating system version;
   generating a first set of entries in a first database record of the data structure for the first resource locator, the first set of entries corresponding to a first distribution location of the application, the first set of entries including the first resource locator in a uniform resource locator (URL) field in the first database record of the data structure;
   assigning the first operating system version of a first device to the first set of entries;
   receiving a property-list metadata file for a second binary file for the application, the property-list metadata file including serialized objects enabled to be executed on a second operating system version;
   generating a second set of entries in a second database record of the data structure for the property-list metadata file, the second set of entries corresponding to a second distribution location of the application, the second set of entries including the property-list metadata file and at least two binary large object (blob) fields in the second database record of the data structure;
   assigning the second operating system version of a second device to the second set of entries;
   generating a logical application using the first set of entries and the second set of entries; and
   presenting a single user interface of the logical application linking to each of the multiple records in the data structure, the user interface having a first user interface element linked to the first set of entries including the URL for the first resource locator and a second user interface element linked to the second set of entries including the blobs and the property-list metadata file.

2. The method of claim 1 further comprising a multiple tab interface, wherein the first user interface element is on a first tab of the multiple tab interface and the second user interface element is on a second tab of the multiple tab interface.

3. The method of claim 1, wherein the first set of entries comprises a minimum operating system version and a maximum operating system version of the first operating system version of the first device and the second set of entries comprises a minimum operating system version and a maximum operating system version of the second operating system version of the second device.

4. The method of claim 1, wherein a type of the first operating system version or a type of the second operating system version is selected from a group consisting of an iOS® version, an Android® operating system version and a Windows® operating system version.

5. The method of claim 1, wherein a type of a first device or the second device is selected from a group consisting of a workstation, a personal computer, a tablet computer, a mobile device and a wearable device.

6. The method of claim 1, further comprising:
   determining a first version of the logical application to install on the first device; and
   causing an installation of the first version of the logical application on the first device based on the determining.
7. The method of claim 1, further comprising:
   determining a second version of the logical application to install on the second device; and
   causing an installation of the second version of the logical application on the second device based on the determining.
8. The method of claim 7, wherein causing the installation of the second version of the logical application further comprises transmitting a push notification event to the second device to download the second version of the logical application onto the second device.
9. A system comprising:
   a processor; and
   a memory device including instructions that, when executed by the processor, cause the processor to:
   define a data structure for a logical application in a database table, the data structure comprising multiple records;
   receive a first resource locator for a first binary file of an application, the first binary file including executable code enabled to execute on a first operating system version;
   generate a first set of entries in a first database record of the data structure for the first binary file of the application, the first binary file including executable code enabled to execute on a first operating system version, the first set of entries including the first resource locator in a uniform resource locator (URL) field in the first database record of the data structure;
   assign the first operating system version of a first device to the first set of entries;
   receive a property-list metadata file for a second binary file for the application, the property-list metadata file including serialized objects enabled to be executed on a second operating system version;
   generate a second set of entries in a second database record of the data structure for the property-list metadata file, the second set of entries corresponding to a second distribution location of the application, the second set of entries including the property-list metadata file and at least two binary large object (blob) fields in the second database record of the data structure;
   assign the second operating system version of a second device to the second set of entries;
   generate a logical application using the first set of entries and the second set of entries; and
   present a single user interface of the logical application linking to each of the multiple records in the data structure, the user interface having a first user interface element linked to the first set of entries including the URL for the first resource locator and a second user interface element linked to the second set of entries including the blobs and the property-list metadata file;
   cause an installation of the logical application on the first device or the second device.
10. The system of claim 9, wherein the first user interface element is on a first tab of the multiple tab interface and the second user interface element is on a second tab of the multiple tab interface.
11. The system of claim 9, wherein the first set of entries comprises a minimum operating system version and a maximum operating system version of the first operating system version of the first device and the second set of entries comprises a minimum operating system version and a maximum operating system version of the second operating system version of the second device.
12. The system of claim 9, wherein the processor is further configured to:
   determine a first version of the logical application to install on the first device;
   determine a second version of the logical application to install on the second device;
   cause an installation of the first version of the logical application on the first device; and
   cause an installation of the second version of the logical application on the second device.
13. One or more non-transitory computer-readable media storing computer-executable instructions executable by one or more processors, the computer-executable instructions comprising:
   instructions that cause the one or more processors to define a data structure for a logical application in a database table, the data structure comprising multiple records;
   instructions that cause the one or more processors to receive a first resource locator for a first binary file of an application, the first binary file including executable code enabled to execute on a first operating system version;
   instructions that cause the one or more processors to generate a first set of entries in a first database record of the data structure for the first resource locator, the first set of entries corresponding to a first distribution location of the application, the first set of entries including the first resource locator in a uniform resource locator (URL) field in the first database record of the data structure;
   instructions that cause the one or more processors to assign the first operating system version of a first device to the first set of entries;
   instructions that cause the one or more processors to receive a property-list metadata file for a second binary file for the application, the property-list metadata file including serialized objects enabled to be executed on a second operating system version;
   instructions that cause the one or more processors to generate a second set of entries in a second database record of the data structure for the property-list metadata file, the second set of entries corresponding to a second distribution location of the application, the second set of entries including the property-list metadata file and at least two binary large object (blob) fields in the second database record of the data structure;
   instructions that cause the one or more processors to assign the second operating system version of a second device to the second set of entries;
   instructions that cause the one or more processors to generate a logical application using the first set of entries and the second set of entries; and
   instructions that cause the one or more processors to present a single user interface of the logical application linking to each of the multiple records in the data structure, the user interface having a first user interface element linked to the first set of entries including the URL for the first resource locator and a second user interface element linked to the second set of entries including the blobs and the property-list metadata file.

14. The computer-readable media of claim 13, the instructions further comprising instructions that cause the one or more processors to present the first user interface element in a first tab of the multiple tab interface and present the second user interface element on a second tab of the multiple tab interface.

15. The computer-readable media of claim 13, wherein a type of the first operating system version or a type of the second operating system version is selected from a group consisting of an iOS® version, an Android® operating system version and a Windows® operating system version.

16. The computer-readable media of claim 13, wherein a type of a first device or the second device is selected from a group consisting of a workstation, a personal computer, a tablet computer, a mobile device and a wearable device.

* * * * *

UNITED STATES PATENT AND TRADEMARK OFFICE
CERTIFICATE OF CORRECTION

| | | |
|---|---|---|
| PATENT NO. | : 9,729,542 B2 | Page 1 of 1 |
| APPLICATION NO. | : 14/689722 | |
| DATED | : August 8, 2017 | |
| INVENTOR(S) | : Jayanti Venkata et al. | |

It is certified that error appears in the above-identified patent and that said Letters Patent is hereby corrected as shown below:

On the Title Page

On page 3, Column 2, under Other Publications, Line 14, delete "2015," and insert -- 2016, --, therefor.

In the Drawings

On sheet 10 of 10, in FIG. 10, under Reference Numeral 1020, Lines 1-2, delete "COMPUTER READABLE" and insert -- COMPUTER-READABLE --, therefor.

In the Specification

In Column 3, Line 28, delete "herein" and insert -- herein. --, therefor.

In Column 20, Line 40, delete "Ski®" and insert -- Siri® --, therefor.

Signed and Sealed this
Thirteenth Day of February, 2018

Andrei Iancu
*Director of the United States Patent and Trademark Office*